United States Patent [19]

Hazen et al.

[11] Patent Number: 5,567,475
[45] Date of Patent: Oct. 22, 1996

[54] NONIONIC SURFACTANTS WITH ENHANCED AQUEOUS DISSOLUTION RATES

[76] Inventors: James L. Hazen, One Red Oak Dr., Plainsboro, N.J. 08536; Mark D. Einziger, 6 Hearthstone Dr., Manalapan, N.J. 07726; William K. Denton, 77 Colonial Ave., Trenton, N.J. 08610

[21] Appl. No.: 382,301

[22] Filed: Jan. 31, 1995

[51] Int. Cl.$^6$ .................................................. B05D 3/12
[52] U.S. Cl. ........................ 427/221; 427/374.4; 427/375; 427/422; 252/363.5; 510/535
[58] Field of Search ...................................... 427/215, 220, 427/221, 213.3, 213.31, 213.32, 374.4, 42.2, 375; 252/91, 89.1, 174.13, 547, 174.21, 174, 174.22, 365.5

[56] References Cited

U.S. PATENT DOCUMENTS

| | | | |
|---|---|---|---|
| 4,216,027 | 8/1980 | Wages | 134/36 |
| 4,406,808 | 9/1983 | Gangwisch et al. | 252/91 |
| 5,084,087 | 1/1992 | Hazen et al. | 71/123 |

FOREIGN PATENT DOCUMENTS 501798  2/1992  European Pat. Off.

OTHER PUBLICATIONS

Weed Technology (1993) vol. 7:633–640 Green & Green.

Pesticide Science (1993) vol. 38:77–84 Nalewaja & Matysiak.

Primary Examiner—Shrive Beck
Assistant Examiner—Erma Cameron
Attorney, Agent, or Firm—John A. Shedden

[57] ABSTRACT

A method for enhancing solid, nonionic surfactant aqueous dissolution rates by spray-coating from about 1 to less than 70 weight percent of diammonium sulfate with the surfactants and the compositions produced thereby.

8 Claims, No Drawings

NONIONIC SURFACTANTS WITH ENHANCED AQUEOUS DISSOLUTION RATES

FIELD OF THE INVENTION

The present invention relates to a process for the preparation of solid nonionic surfactant compositions and the compositions produced thereby which have dissolution rates in water much higher than the surfactants alone.

BACKGROUND OF THE INVENTION

Surfactants have many end-use applications well known to those in the art wherein it is desirable to be able to alter and/or control the dissolution rate of the surfactant once it is intimately admixed with water. In certain situations, it becomes desirable to slow the rate at which the surfactants solubilize, for example, when used in toilet bowl cleaning cakes. More often, it is desired to increase the rate at which the solid surfactant dissolves into the aqueous medium. This enhanced rate of dissolution would be desirable, for example, in dishwashing or laundry powdered detergent situations. Heretofore, attempts to control the times of solid surfactant solubilization have taken various forms, such as using incorporated binders, extrusion granulation, membrane encapsulation, or tableting, i.e., compression of the surfactant-containing compositions all of which possess attendant disadvantages. For example, encapsulation is highly dependent upon the quality of the encapsulating material and may release the compositions in discrete packages. The compaction process is an extremely difficult way to control the release of surfactant material for slight variations in composition properties, e.g., tackiness, particle size, etc. can have dramatic impact on the dissolution rate even under fixed, uniform compacting pressure.

Extrusion processing to prepare melt-admixed granules, such as is taught in EP 501,798A1 has the disadvantage of always intimately admixing all of the components thus inherently placing a restriction on the individual components that can be utilized in such a process, i.e., they must be compatible. Furthermore, initially all of the material components will be exposed to the aqueous medium simultaneously, i.e., one cannot program for differing dissolution rates.

Granule-type products, i.e., multi-component particles are desirable in many end-use applications for they are more stable during storage and transport than mere physical mixtures of the dry individual components.

It would be advantageous if a process means relatively insensitive to minor process or product variations were available to avoid the above-identified problems of the prior art and to not only increase the rate at which nonionic solid surfactants dissolve in aqueous medium, but also permit i) incompatible components to be incorporated into a single particle and ii) preferential or sequential exposure of selected components to the aqueous media.

SUMMARY OF THE INVENTION

It is an object of the present invention to realize a process for preparing solid nonionic surfactant compositions with significantly enhanced and easily predictable and controllable aqueous dissolution rates. This is accomplished by spray-coating diammonium sulfate crystals with the molten surfactant composition.

DETAILED DESCRIPTION OF THE INVENTION

It has been discovered that the time for complete dissolution in water of certain solid, nonionic surfactants and surfactant compositions can be significantly reduced when the solids are spray-coated onto diammonium sulfate.

By "spray-coated" is meant that the solid surfactant is melted and coated upon the sulfate while still in the molten state. This is done by spraying the molten surfactant onto the diammonium sulfate particles in a coating blender.

Complete coating of the sulfate particles is not always necessary but, rather, the degree of completeness of the coating is often determined by specific requirements such as the need to isolate the diammonium sulfate from other added incompatible adjuvants. The sprayed material, while still in a tacky state, is then continuously tumbled to partially agglomerate or granulate the individual particles so as to yield dry flowable granules.

The nonionic surfactants whose dissolution rate can be enhanced by the processes of this invention are those known in the art which are solid or of a hard, nontacky wax consistency at room temperature.

Among the preferred nonionics are the following:

A) Amides such as:

i) Alkanolamides of the formula

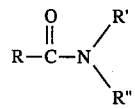

wherein R' and R" each can be —H, —CH$_2$CH$_{20}$H, or

—CH$_2$—CH—OH;
   \
    CH$_3$ ii) ethoxylated alkanolamides of the formula

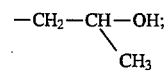

iii) ethylene bisamides of the formula

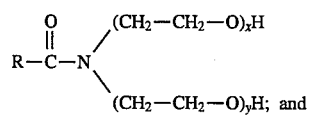

B) Esters such as:

i) fatty acid esters of the formula

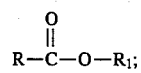

ii) glycerol esters of the formula $$R-\overset{O}{\underset{\|}{C}}-O-CH_2-\underset{\underset{OH}{|}}{CH}-CH_2-O-R_1;$$

iii) ethoxylated fatty acid esters of the formula $$R-\overset{O}{\underset{\|}{C}}-O(CH_2CH_2O)_x-R_1;$$

iv) sorbitan esters of the formula

[structure: sorbitan ester with HO, OH groups and $CH-CH_2-O-\overset{O}{\underset{\|}{C}}-R$; and OH]

v) ethoxylated sorbitan esters of the formula

[structure: ethoxylated sorbitan ester with $H-(OCH_2CH_2)_n-O$, $O-(CH_2CH_2O)_x-H$, $O-(CH_2CH_2O)_yH$, and $CH-CH_2-O-\overset{O}{\underset{\|}{C}}-R$]

C) Ethoxylates such as:

i) alkylphenol ethoxylates of the formula

[structure: $R$—phenyl($R_1$)—$(OCH_2CH_2)_nOH$;]

ii) alcohol ethoxylates of the formula $$R-O-(CH_2CH_2O)_nH;$$

iii) tristyrylphenol ethoxylates of the formula

[structure: tristyrylphenol ethoxylate with $(OCH_2CH_2)_nOH$ and three CH(CH_3)-phenyl groups]; and iv) mercaptan ethoxylates of the formula $$R-S-(CH_2CH_2O)_nH$$

D) End-capped and EO/PO block copolymers such as:

i) alcohol alkoxylates of the formula $$R-(OCH_2CH_2)_x-(O-\underset{\underset{CH_3}{|}}{CH}-CH_2)_m-OH;$$

ii) ethylene oxide/propylene oxide block copolymers of the formula $$HO-(CH_2CH_2O)_x(CH_2-\underset{\underset{CH_3}{|}}{CH}-O)_m-(CH_2CH_2O)_y-H;$$

iii) copolymers of the formula $$HO(\underset{\underset{CH_3}{|}}{CH}-CH_2O)_m-(CH_2CH_2O)_x-(CH_2-\underset{\underset{CH_3}{|}}{CHO})_lH;$$

iv) chlorine capped ethoxylates of the formula $$R-(OCH_2CH_2)_xCl;\ \text{and}$$

v) tetra-functional block copolymers of the formula

[structure: 
$H(OCH_2CH_2)_x-(OCHCH_2)_m$ with $CH_3$, and $(CH_2CHO)_{m'}-(CH_2CH_2O)_{x'}H$ with $CH_3$, linked by $NCH_2CH_2N$, with $H(OCH_2CH_2)_y-(OCHCH_2)_l$ with $CH_3$, and $(CH_2CHO)_{l'}-(CH_2CH_2O)_{y'}H$ with $CH_3$]

or

[structure:
$H(OCHCH_2)_m-(OCH_2CH_2)_x$ with $CH_3$, and $(CH_2CH_2O)_{x'}-(CH_2CHO)_{m'}$ with $CH_3$, linked by $NCH_2CH_2N$, with $H(OCHCH_2)_l-(OCH_2CH_2)_y$ with $CH_3$, and $(CH_2CH_2O)_{y'}-(CH_2CHO)_{l'}$ with $CH_3$]

wherein

R is a fatty alkyl group, preferably a $C_6$–$C_{22}$ fatty alkyl group, most preferably a $C_8$–$C_{18}$ fatty alkyl group;

$R_1$ is —H or a fatty alkyl group, preferably —H or a $C_6$–$C_{22}$ fatty alkyl group, most preferably—H or a $C_8$–$C_{18}$ fatty alkyl group;

x, x', y, y' and n are each independently moles of ethylene oxide preferably 1 to 300; most preferably 1 to 150; and m, m', l and l' are each independently moles of propylene oxide, preferably 1 to 300; most preferably 1 to 150;

with the proviso that the surfactant is a solid at room temperature (24° C.), preferably a solid at 50° C.

Mixtures of the above surfactants are acceptable and, in fact, mixtures of the above surfactants with other nonionics that alone are liquid even at room temperature may be acceptable provided that the amount or nature of the liquid surfactant is such that the final particulate product does not exhibit tackiness at room temperature. Preferably, tackiness is not exhibited even at 50° C.

The solid, nonionic surfactants of the instant invention should be present from greater than 30 to about 99 weight percent, preferably from about 50 to about 97 weight percent, said percent based on the total spray-coated formulation.

The more preferred solid nonionic surfactants are the aforedescribed alkyl alcohol ethoxylates and alkylphenol ethoxylates.

The most preferred solid nonionic surfactant is dinonylphenol ethoxylate (>100 EO) for it has been discovered that this compound possesses the ability to provide excellent wetting characteristics together with a high melting point. Furthermore, the material exhibits an ability to dissolve in aqueous medium without formation of a gel phase.

The amount of diammonium sulfate to be spray-coated by the solid nonionic composition can be from about 1 to less than 70 weight percent, preferably from about 3 to about 50 weight percent based on the total weight of the final spray-coated composition.

The essence of the instant invention lies in the discovery that if solid nonionic surfactant compositions are spray-coated upon diammonium sulfate, the dissolution rate of the dry surfactant particulate composition in aqueous solution is greatly enhanced. It is also hypothesized that in addition to the action of the ammonium sulfate per se upon the dissolution rate of the solid, nonionic surfactant composition, the coating process tends to entrap air within the coated granules thereby increasing the surface area ultimately exposed to the aqueous medium which increases the dissolution rate (as opposed to compaction and extrusion processes which tend to compress air out of the particles). Also, the pockets of entrapped air function as flotation aids which assist in keeping the coated granules from settling.

The preferred process of the instant spray-coating invention comprises the steps of:

a) adding diammonium sulfate to a blender chamber;

b) mixing said diammonium sulfate to ensure uniform distribution;

c) melting the initially solid nonionic surfactant, preferably at a temperature of from about 65° to about 95° C. (149°–203° F.);

d) spraying the molten surfactant composition onto the diammonium sulfate in said blender chamber with continuous blending to effect a coating and granulation of the sulfate; and e) cooling the coated granules, preferably to less than 50° C. (122° F.).

Preferably, the diammonium sulfate is initially blended for at least 10 minutes before the spraying step to ensure that the initial crystal sizes are uniformly distributed throughout the batch. The preferred spray blender-mixers are those of the Mark VI design manufactured by Continental Rollo or an equivalent.

Preferably, to aid in providing a uniform coating and also to avoid undesirable agglomeration, the mixture should continue to be blended for at least three additional minutes after the spraying has ceased. If it is desired to have any of the additional components adhere to the surface of the coated granules, e.g., if an additional additive is a fine powder and one desires to reduce dusting in the final product, the material can be added while the coated granules are still tacky to obtain adherence, i.e., the material can be added before the coated material is completely cooled. Examples of such optional additional components include anti-foam agents, flow agents, anti-caking agents, stabilizers, inert fillers, gas-generating agents, dyes, and/or any adjuvants particular to the specific end-use application of the resulting product.

Optional adjuvants can be added from about 0 to about 20 weight percent of the granular composition. Inert ingredients can be present from about 0 to about 80 weight percent.

One of the distinct advantages of the instant spray-coated, i.e., multi-layered particle is that it frees the preparer from many of the restrictions normally imposed upon multi-component systems manufacturers. For example, additional adjuvant components which normally would be incompatible with the diammonium sulfate can be made a part of the coated particle by introducing the component after the coating process is completed, but while the multi-layered material is still tacky so that the adjuvant can be adhered to the outer surface, i.e., the component would only be in contact with the nonionic composition layer.

Another advantage realized by this adherence contact procedure is that since it allows material to be placed on the outside of the spray-coated particle, it gives the adhered material preferential or advanced exposure to the aqueous media. Thus, one can also selectively sequence the exposure times of certain components of the particle.

The diammonium sulfate of the instant process preferably should be of a coarse grade; most preferably 95 weight percent of the material should be in the average particle size diameter of from about 200 to about 600 microns, i.e. 95 weight percent should pass through a 30 mesh (U.S. Standard) screen and not pass through a 70 mesh (U.S. Standard) screen. Elimination of fines is preferred to minimize compaction or undesirable agglomeration of the diammonium sulfate particles during the coating process.

The coated composition may be used as is or, if preferred, screened to a desired particle size.

The following specific examples are further illustrative of the present invention, but it is understood that the invention is not limited thereto. All amounts of various ingredients are by weight unless otherwise specified. In all of the following Examples, the dissolution rates were determined as follows:

A calculated amount of product such that the surfactant weight remained at 2.0 grams is added into a 250 ml beaker filled with 98 ml of deionized water at room temperature while stirring with a magnetic stirrer set to a speed of about 30–50% full scale and a stopwatch started. When complete dissolution is observed, i.e., the solution becomes completely clear, the time is recorded.

EXAMPLES I–II

A flaked dinonylphenol ethoxylate (>100 EO) (sold under the Rhone-Poulenc trademark Igepal DM-970 FLK) is blended with a sufficient amount of a liquid isodecyl alcohol ethoxylate (4 EO) (sold under the Rhone-Poulenc trademark Rhodasurf DA-530) to produce a non-tacky, solid mixture with an 85:15 respectively weight ratio surfactant Composition A (said nonionic surfactant composition blend also sold under the Rhone-Poulenc trademark AgRHô DS 420). Although the isodecyl alcohol ethoxylate has an adverse effect on the melting point of the solid dinonylphenol ethoxylated surfactant, its presence is useful for the improved wetting characteristic it provides, i.e., the lower surface tension realized in the final aqueous solution as a result of its incorporation.

At room temperature, dry diammonium sulfate is added to the dry Composition A prepared above in a Sigma Blade Mixer in a weight ratio of approximately 85:15 weight percent sulfate to surfactant. Blending is unable to be accomplished because the materials compress together and cake.

The test is run again utilizing solely Igepal DM-970 FLK, a trademark of Rhone-Poulenc for flaked dinonylphenol ethoxylate (>100 EO), in lieu of Composition A. Again, the blending is unsuccessful because, even at room temperature, the surfactant and diammonium sulfate compact to form cakes.

EXAMPLES III–VI

Diammonium sulfate is charged into a Continental Rollo mixer Mark VI blender. The sulfate is rotationally blended for about 10 minutes. A solid nonionic surfactant composition comprising Igepal DM-970 FLK, a trademark of Rhone-Poulenc for dinonylphenol ethoxylate (>100 EO) and Igepal DA-530, a trademark of RHONE-Poulenc for isodecyl alcohol ethoxylate (4 EO) respectively, (said nonionic surfactant composition blend sold under the Rhone-Poulenc trademark AgRHô DS 420) is heated at a temperature of about 85° C. until the surfactant composition is melted. The molten surfactant is then sprayed onto the rotating diammonium sulfate through fine sized 8008E spray tips. The mixture is blended continuously for three additional minutes to ensure uniform coating and granulation. The mixture is then cooled to about 45° C. at which time an antifoam agent is blended into the mixture for three minutes. The coated granular product is collected through a #8 (U.S. Standard) mesh screen. In these and the following examples, the weight percentages as indicated are based on the total weight of the final formulation.

TABLE I

| Sample | Dinonyl-phenol Ethoxylate (>100 EO) Flaked | Isodecyl Alcohol Ethoxylate (4 EO) Liquid | Ammonium Sulfate | Antifoam Agent* | Dissolution Time (Min.) |
|---|---|---|---|---|---|
| Control | 85.00% | 15.00% | — | — | 4:25 |
| 1 | 81.00% | 13.00% | 5.00% | 1.00% | 2:50 |
| 2 | 79.00% | 10.00% | 10.00% | 1.00% | 2:40 |
| 3 | 75.00% | 9.00% | 15.00% | 1.00% | 2:35 |

*a polyorganosiloxane sold under the Rhone-Poulenc trademark Rhodorsil Silicone EP 6703

The resulting dissolution times of the solid nonionic surfactant compositions indicate the significantly enhanced dissolution rates that can be unexpectedly realized by this invention, i.e., by the intimate spray-coating of diammonium sulfate with the surfactant.

In addition to the aforementioned enhanced dissolution; incompatibility avoidance; and preferential dissolution advantages, the coated products of this invention also realize a very uniform particle size together with excellent attrition resistance. Serendipitously, the process is significantly less energy intensive and more capital cost effective than other melt-admixing processes, e.g., extrusion processes of the prior art.

Although the present invention has been described and illustrated with reference to specific examples, it is understood that modifications and variations of composition and procedure are contemplated within the scope of the following claims:

We claim:

1. A method for enhancing the aqueous dissolution rate of a solid, nonionic surfactant comprising:

a) mixing diammonium sulfate in a blending chamber;

b) melting the nonionic surfactant;

c) spraying the molten surfactant onto the diammonium sulfate with continuous blending to achieve coating and granulation of the sulfate whereby a coated composition comprising diammonium sulfate coated with the surfactant is formed; and d) cooling the coated composition; wherein said diammonium sulfate comprises from about 1 to less than 70 weight percent of the coated composition; the weight percent based on the total weight of the coated composition.

2. The method of claim 1 wherein the diammonium sulfate is present from about 3 to about 50 weight percent of the coated composition.

3. A method for enhancing the aqueous dissolution rate of a solid, nonionic surfactant comprising:

a) mixing diammonium sulfate in a blending chamber;

b) melting a nonionic surfactant selected from the group consisting of:
   i) alkanolamides

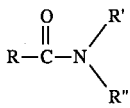

wherein R' and R" each can be

—H, —CH$_2$CH$_2$OH, or —CH$_2$—CH(CH$_3$)—OH;

ii) ethoxylated alkanolamides of the formula

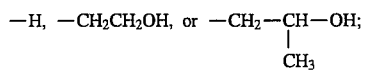

iii) ethylene bisamides of the formula

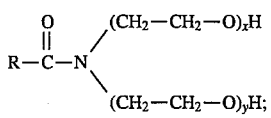

iv) fatty acid esters of the formula

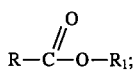

v) glycerol esters of the formula

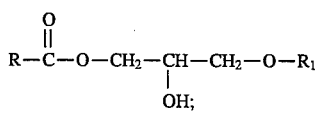

vi) ethoxlated fatty acid mono esters of the formula

vii) sorbitan esters of the formula

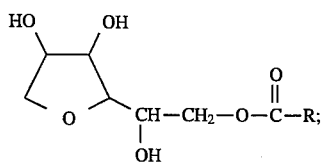

viii) ethoxlated sorbitan esters of the formula

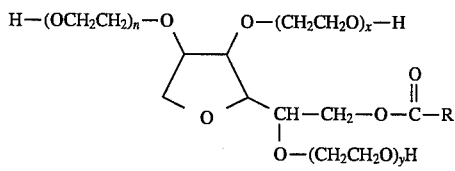

ix) alkylphenol ethoxlates of the formula

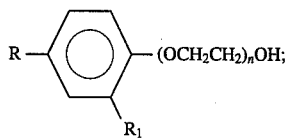

x) alcohol ethoxylates of the formula

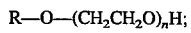

xi) tristyrylphenol ethoxlates of the formula

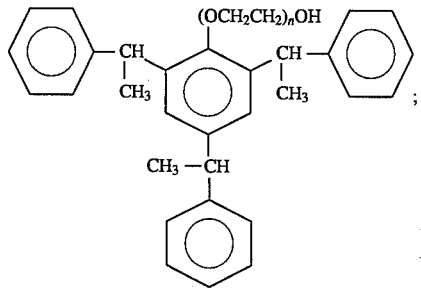

xii) mercaptan ethoxylates of the formula

xiii) alcohol alkoxylates of the formula

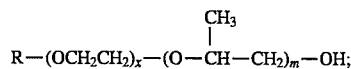

xiv) ethyleneoxide/propyleneoxide block copolymers of the formula

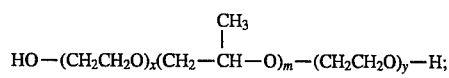

xv) copolymers of the formula

xvi) chlorine capped ethoxylates of the formula

xvii) tetra-functional copolymers of the formula

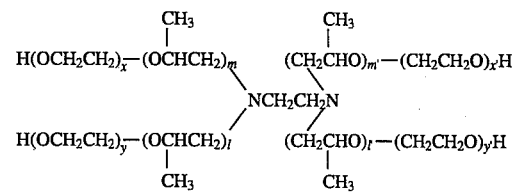

or

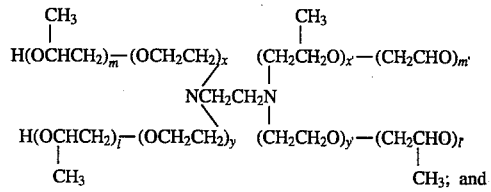

xviii) mixtures thereof wherein
R is a fatty alkyl group;
$R_1$ is —H or a fatty alkyl group; x, x', y, y', and n are each independently moles of ethyleneoxide; and m, m', l, and l' are each independently moles of propyleneoxide; and
with the proviso that the surfactant is solid at 24° C.;

c) spraying the molten surfactant onto the diammonium sulfate with continuous blending to achieve coating and granulation of the sulfate whereby a coated composition comprising diammonium sulfate coated with the surfactant is formed; and d) cooling the coated composition wherein said diammonium sulfate comprises from about 1 to less than 70 weight percent of the coated composition; the weight percent based on the total weight of the coated composition.

4. The method of claim 3 wherein the diammonium sulfate is present from about 3 to about 50 weight percent based on the coated composition.

5. The method of claim 3 wherein
R fatty alkyl groups are from $C_6$ to $C_{22}$
$R_1$ is —H or the fatty alkyl groups are from $C_6$ to $C_{22}$;
x, x', y, y', and n are each independently 1 to 300; and
m, m', l, and l' are each independently 1 to 300.

6. The method of claim 5 wherein

R is $C_8$–$C_{18}$ alkyl;

$R_1$ is —H or $C_8$–$C_{18}$ alkyl;

x, x', y, y', and n are each independently from 1 to 200; and m, m', l, and l' are each independently from 1 to 200.

7. The method of claim 1 wherein i) the nonionic surfactant is melted at from about 65° C. to about 95° C.; and ii) the coated composition is cooled to less than about 50° C.

8. The method of claim 3 wherein i) the nonionic surfactant is melted at from about 65° C. to about 95° C.; and ii) the coated composition is cooled to less than about 50° C.

* * * * *